United States Patent
Cho et al.

(10) Patent No.: US 8,495,552 B1
(45) Date of Patent: Jul. 23, 2013

(54) STRUCTURED LATCH AND LOCAL-CLOCK-BUFFER PLANNING

(75) Inventors: Minsik Cho, Austin, TX (US); Ruchir Puri, Baldwin PLace, NY (US); Haoxing Ren, Austin, TX (US); Hua Xiang, Ossining, NY (US); Matthew M. Ziegler, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/536,601

(22) Filed: Jun. 28, 2012

Related U.S. Application Data

(63) Continuation of application No. 13/487,062, filed on Jun. 1, 2012.

(51) Int. Cl.
   *G06F 17/50*   (2006.01)
(52) U.S. Cl.
   USPC ............................ 716/132; 716/105; 716/119
(58) Field of Classification Search
   USPC .......................................... 716/105, 119, 132
   See application file for complete search history.

(56) References Cited

U.S. PATENT DOCUMENTS

| | | | |
|---|---|---|---|
| 6,549,050 B1 | 4/2003 | Meyers | |
| 6,609,238 B1 | 8/2003 | Tetelbaum | |
| 6,920,625 B2 | 7/2005 | Gass | |
| 7,549,137 B2 | 6/2009 | Alpert | |
| 7,823,115 B2 * | 10/2010 | Habitz et al. | 716/130 |
| 7,839,175 B2 | 11/2010 | Franch | |
| 2009/0193377 A1 | 7/2009 | Puri | |
| 2011/0035712 A1 | 2/2011 | Gaugler | |

FOREIGN PATENT DOCUMENTS

| | | |
|---|---|---|
| EP | 0702240 A3 | 4/1996 |
| EP | 0420388 B1 | 8/1997 |

OTHER PUBLICATIONS

"Rumble: an incremental timing-driven physical synthesis optimization algorithm", Papa, D.A., et al., IEEE Transaction on Computer-Aided Design of Integrated Circuits and Systems, vol. 27, #12, pp. 2156-2168, (Dec. 2008).

* cited by examiner

*Primary Examiner* — Thuan Do
(74) *Attorney, Agent, or Firm* — George Sai-Halasz; Preston J. Young

(57) ABSTRACT

Latches and local-clock-buffers are automatically placed during integrated circuit physical synthesis. Prior to physically laying out the datapath, locations are assigned for the latches based on a logical representation of the datapath and on the fixed placements of pins. The computed latch locations optimize the datapath according to some predetermined criteria. Local-clock-buffers are also preplaced together with the latches further improving datapath performance.

15 Claims, 3 Drawing Sheets

US 8,495,552 B1

STRUCTURED LATCH AND LOCAL-CLOCK-BUFFER PLANNING

CROSS REFERENCE TO A RELATED APPLICATION

This application is a Continuation of application Ser. No. 13/487,062, filed Jun. 1, 2012, which is incorporated herein by reference in its entirety.

BACKGROUND

The present invention relates to integrated circuit (IC) design. In particular, it relates to placement of latches and local-clock-buffers during the physical synthesis of ICs.

BRIEF SUMMARY

In the physical synthesis of an integrated circuit one connects latches and pins using a logical representation of the datapath. Prior to physically laying out the datapath, fixed placements for the pins is accepted while locations for the latches are assigned based upon a logical representation of the datapath. Using such preplacement for the latches, the datapath may be optimized according to some predetermined criteria. Local-clock-buffers are also preplaced together with the latches further optimizing datapath performance. At least one step of the physical synthesis is automatically executed by a computer,

BRIEF DESCRIPTION OF THE SEVERAL VIEWS OF THE DRAWINGS

These and other features of embodiments of the invention will become apparent from the accompanying detailed description and drawings, wherein.

DETAILED DESCRIPTION

Figure 1:
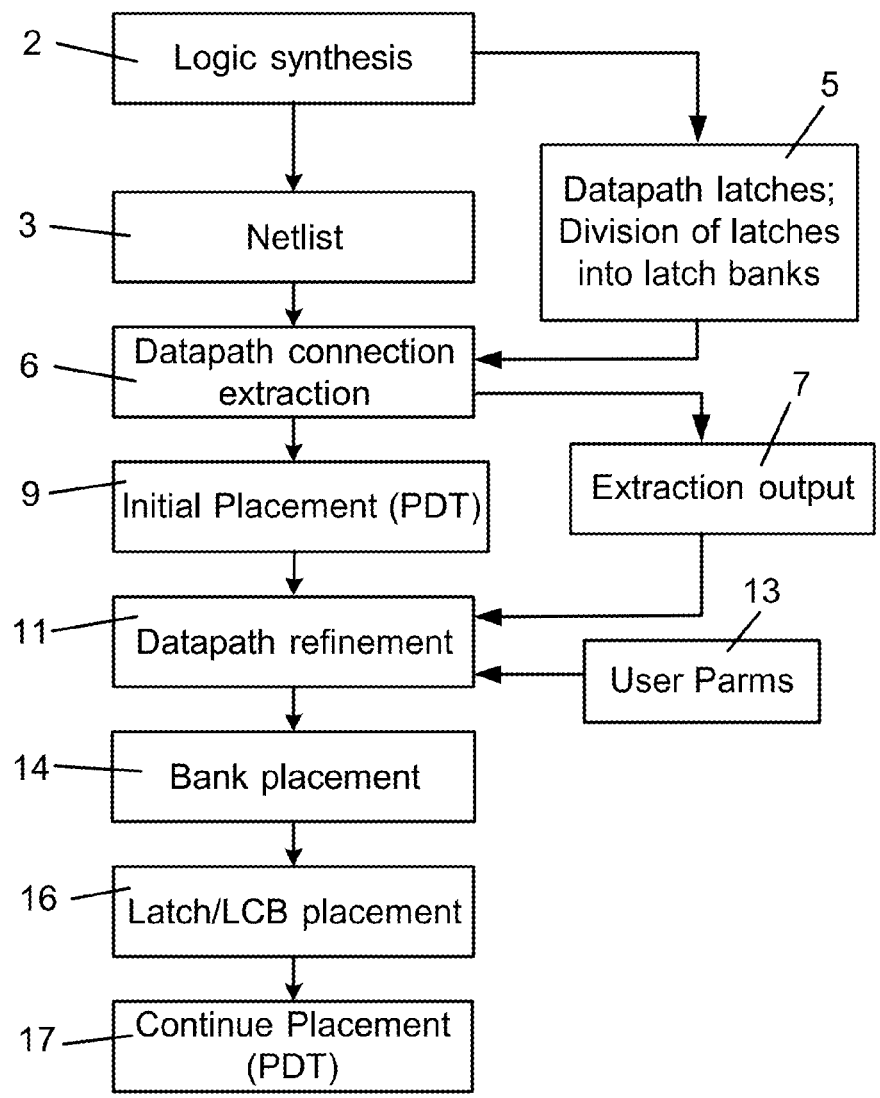
FIG. 1 shows a flowchart for a representative embodiment of the disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "logic," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, and computer program products according to embodiments of the invention. It will be understood that each block of the flowchart illustrations and/or block diagrams, and combinations of blocks in the flowchart illustrations and/ or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the description of the computer executable method and/or the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Integrated Circuits (IC) are of central importance in information processing. Today's IC are generally thought of in terms of very large scale integration (VLSI), with semiconductor chips containing upward of tens of millions of transistors. Embodiments of the present disclosure deal with advancements in physically laying out—commonly referred to as physical synthesis—an IC in the general framework of VLSI, dealing with large number of circuits.

A latch is a key data element in VLSI design because it stores intermediate computational results. The way latches are placed in VLSI physical synthesis has implications in several ways, including in terms of chip performance. Since latches are connected to both combinatorial logic and to the circuit's clocking network, placement of latches is not an easy task.

Due to the significance of placing latches in terms of overall IC quality, and due to the complexity of the problem, in the prevailing art latches are typically manually placed by designers. More specifically, latches are placed and fixed at their desired locations before any other logic elements are placed in order that designer's intentions with regard to the latches is kept and carried through the entire design flow.

However, as VLSI chip complexity keeps growing, manually placing latches becomes tedious and time consuming task for human designers. Relying on human designers, the layouts may also be error prone. Embodiments of this disclosure present a method and system for an automated physical layout of the latches and local-clock-buffers (LCBs) using computers. These automatic placements may yield comparable quality to the one human designers are capable of achieving.

For the physical placement of latches in an IC it is deemed to be of good quality if the datapath logic is clean between the latches. Expressed in other way, the latches should be placed in a datapath-oriented way. The term "datapath" in general refers to the route that data follows within a circuit, system, processor, or the like; more specifically in the present case the path that data would follow within the IC chip.

In placing the latches, besides aiming for clean datapath logic between latches, one may also have to honor some preexisting constraints. Such constrain may be the already existing pin locations in the chip. Such pin locations should be accepted as they may be the starting points of the datapath logical processing. One may desire to make the datapath between latches straight in order that the wiring between the latches to be clean/easy, consequently conducive to higher processing power for the IC.

It is understood that IC design automation is well known in the electronic arts. There is a wide variety of available software for IC design. Any given element of such software aimed at a particular task is generally called a "tool". In the instant specification the term "tool" will also be used in this manner. It is further understood that there are large number of tools that may be involved in the full design of an IC. For embodiments of this disclosure it is understood that the whole range of known tools are available for the discussed IC design, but only those tools will be detailed that are novel, or that are directly related to the embodiments of the present invention.

FIG. 1 shows a flowchart for a representative embodiment of the disclosure. The IC logic already has undergone synthesis 2 by methods known in the art, and may be represented by a hardware description file (HDL), as it is also known in the art.

In embodiments of the instant disclosure, from the standard HDL file one may now extract the datapath latches 5 as well as extract a netlist 3. Furthermore, the latches may be divided into latch banks 5. A latch bank is defined as a set of latches with the same logical nature. For example, if there is a 32 bit bus in the design, the 32 latches near the end of the bus would be in the same bank. From the physical placement point of view, latches in the same bank would preferably be placed close to one another. In the following those of the latches that pertain to the same latch bank often will be referred to as "same bank latches".

Using the extracted netlist and latches, one may create a simplified datapath connection picture 6. The output of such an operation 7 may be called a datapath graph. This graph is made up of latches and pins connected by the dataflow logic. The logic flow is simplified in comparison to the HDL file. For example, if there are two gates between the latches L1 and L2, one may ignore the gates and directly connect L1 and L2 in the graph. Thus the latches and pins become connected by a logical representation of the datapath. The pins typically have already fixed placement and are not available for optimized physical layout. Thus, the task may be to assign physical locations for the latches using the extracted logical representation of the datapath, including the fixed pin locations, in such manner as to optimize the datapath performance in accordance with some predetermined criteria.

Commencing the layout, one may perform an initial placement 9 of the datapath with a standard placement tool (PDT). This initial placement may serve as a guidance for the changes to be made by the embodiments of the present disclosure. However, this initial placement is not to be regarded as the real physical layout of the datapath, which step will only occur after the preplacement of the latches and LCBs.

Next, the initial placement of the datapath is refined 11 with the input of the extracted dataflow graph, and with possible parameters that a user may input for a specific case 13. Such user input may be, for instance, delineation of regions from which certain latches cannot be moved out.

The following step in the layout may be the placement of latch banks 14 into the datapath. The manner the banks are defined, namely having the same logical nature, indicates that same bank latches should be close to one another in the direction parallel with the direction of the datapath. If we arbitrarily call the direction of the dataflow as "y-direction", then one may formulate the task as having to group together the same bank latches in the y-direction. For these latches one has to assign y coordinates as close together as possible. One may prefer identical y coordinates for all latches within the same bank, but that may not be always possible, for instance, due to conflicts with user input parameters that have priority.

Figure 2:
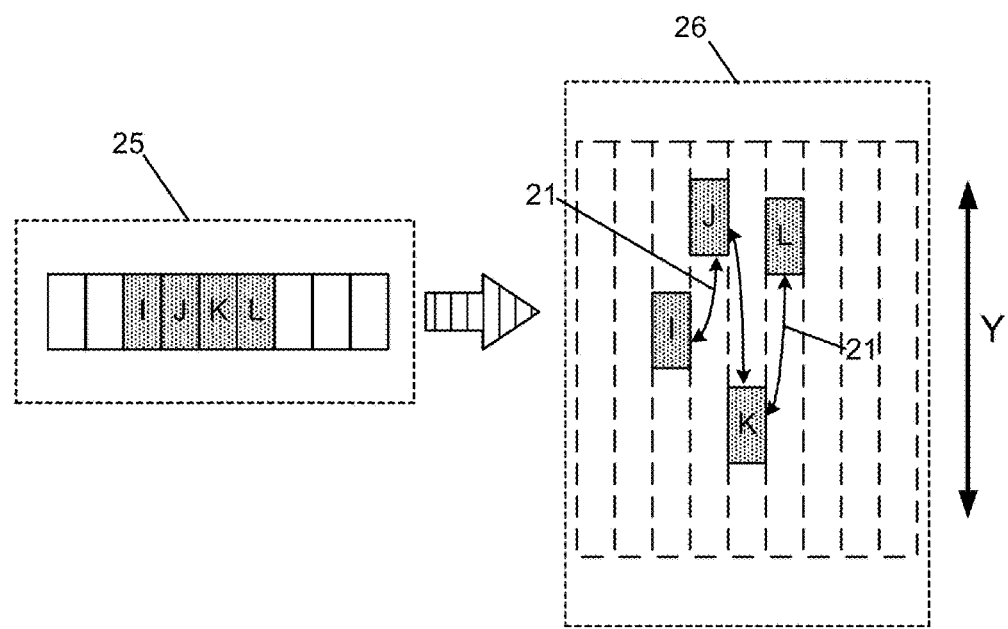
FIG. 2 schematically shows placement of a latch bank in the datapath.

FIG. 2 schematically shows placement of a latch bank. For example, one may have four, I, J, K, and L, latches pertaining to the same bank 25. In order to have ideal datapath-aware latch placement 26, identical y coordinates should be assigned to these four latches. Without intent of limiting, one may put higher virtual connections, or attractors 21 between these latches so that the y-direction grouping will be forced; they will be physically placed close to one another in the y-direction. The y-direction is indicated in the figure with the double arrow.

Once, as shown in FIG. 2, the placement is done, one may take the average of the y coordinate values of the same bank latches and set this average y value as the y value of that particular bank.

In the global selection of bank y-direction locations, one may use a predetermined criteria for optimization, such as for instance, the need to minimize total wire length in the datapath. Consequently, one may derive the predetermined criteria of y-direction optimization from functions related to minimizing total wire length in the datapath. In it simplest form such a function may be the sum of all wire length in the datapath.

In representative embodiments of the disclosure, once the y coordinates have been determined one may proceed with placing the individual latches for each same bank latch in the x-direction 16. The "x-direction" term is used as the direction perpendicular to the y-direction, meaning, of course, that the x-direction is also perpendicular to the data flow direction.

While computing the x coordinate for each latch, one may want to optimize the datapath flow as obtained in the datapath graph. In general, one may apply linear programming or min-cost network flow optimization techniques to such a problem. In keeping with optimization, first one may want to determine the order in which each latch bank will be dealt with. Such selection may be guided by the number of connections to fixed objects (such as pins) that same bank latches have. The banks are ordered based on decreasing number of connections to the fixed objects. Accordingly, a bank with more fixed object connections will be processed earlier.

Next, one may compute 16 the network flow cost for an x-direction location of each same bank latch, based on the datapath flow graph. Basically, one desires to make all the edges in the graph as straight as possible. Consequently, one may derive the predetermined criteria of x-direction optimization from functions related to minimizing wire length perpendicular to the direction of the dataflow, the x-direction. In it simplest form such function may be the sum of all x directional wire length in the datapath.

Figure 3:
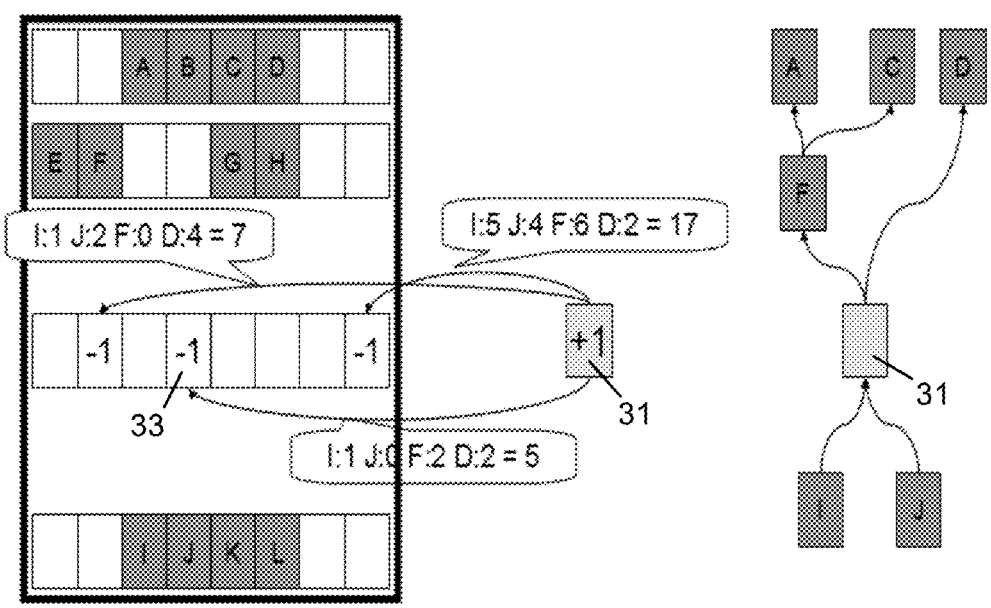
FIG. 3 schematically illustrates inserting of latches pertaining to the same bank.

FIG. 3 schematically illustrates inserting of latches pertaining to the same bank. In the example of the figure all the latches with letters, A, B, C, etc. have already been inserted, and one wants to determine the optimal location for the latch indicated as 31. On the right hand side of FIG. 3 the dataflow graph shows that latch 31 connects to latches I, J, F, and D. These latches have different y coordinates than latch 31, pertaining to different banks than latch 31. The available free spots for latch 31 are indicated with the number −1. Each free spot has an associated placement cost, based on misalignments in the y-direction relative to those latches that the contacts have to be made. An optimal free spot is the one having a minimum of the placement cost. In the example of the figure, without intent of limiting, a weight of 1 is given for each spot of y-directional misalignment. Thus, one can see that the three free spots carry respective penalties of 7, 17, and 5. Consequently latch 31 may be placed into the free spot having the penalty of 5; 0 penalty with respect to latch J, 1 with respect to latch I, and 2 with respect of latches F and D. For bookkeeping reasons in the example, and again without intent of limiting, free spots carry a −1 count and unplaced latches, as the one indicated as 31 carry a count of 1. Placing the latch removes the number −1 count, and removes this spot for this particular latch from the available free spots.

It is understood that this example is only given for illustration. Typically in embodiments of the present invention known advanced techniques such as linear programming or min-cost network flow optimization are used to insert same bank latches. Such techniques globally optimize, and may happen that more than one, or maybe all latches are simultaneously placed. Not every one of the latches would end up in a minimum placement cost position as illustrated above, rather the overall x-direction placement cost would be minimized.

One may successively continue with the depicted process until all same bank latches have been placed in their optimal x-directional spots. In calculating the placement penalties, of course one is not restricted to the simple distance counting of the presented example. Other schemes, for instance quadratic weighing may also be used. It is possible that after many rerunning of the placements with different optimization functions, one may find the best such function on an empirical basis.

Returning to the flowchart of FIG. 1, having finished with the x-directional insertion of the latches, one may finalize the placement of the LCBs among latches 16. This placement should be such that the requirements for latch-to-LCB can be met. Such requirements may be to limit the maximum number of latches per LCB; not to exceed a maximum load on an LCB; not to exceed a maximum distance from LCB to latch. Along these lines, one may further partition each bank into multiple groups so that the latches in a group can be driven by the clocking network with a corresponding LCB. For each such group, one can create an instance of an LCB, thus, having sufficient number of LCBs to drive the latches in each bank.

With the placing of the LCBs the embodiment of the instant disclosure may have completed the task. The x and y coordinates of each latch has been provided so that the latches can be preplaced in the computed locations prior to the whole of the datapath being laid out. The predetermined criteria for the computed latch placements, as discussed above, may come from functions related to minimizing total wire length in the datapath, or functions related to minimizing wire length perpendicular to the direction of the datapath, or related to minimizing a combination of both. Sometimes an optimization function may be arrived at based on empirical considerations. For LCB placement considerations for speed in form of capacitive loading also may play a role.

After having placed the latches and LCBs in a computer executed automated manner prior to physically laying out the datapath, one may continue by completing the physical layout of the datapath, box 17 of FIG. 1. This completing may be done with standard tools, however, with the latches and LCBs considered as fixed objects.

In the foregoing specification, the invention has been described with reference to specific embodiments. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

In addition, as will be understood by those skilled in the art, the structures described herein may be made or used in the same way regardless of their position and orientation. Accordingly, it is to be understood that terms and phrases such as "x-direction," "y-direction," "side," "next", "underneath" etc., as used herein refer to relative location and orientation of various portions of the structures with respect to one another, and are not intended to suggest that any particular absolute orientation with respect to external objects is necessary or required.

The foregoing specification also describes processing steps. It is understood that the sequence of such steps may vary in different embodiments from the order that they were detailed in the foregoing specification. Consequently, the ordering of processing steps in the claims, unless specifically stated, for instance, by such adjectives as "before", "ensuing", "after", etc., does not imply or necessitate a fixed order of step sequence.

Many modifications and variations of the present invention are possible in light of the above teachings, and could be apparent for those skilled in the art. The scope of the invention is defined by the appended claims.

The invention claimed is:

1. A system, comprising:
    at least one processor for performing a plurality of actions, said plurality of actions comprising:
    connecting latches and pins by a logical representation of a datapath, wherein said pins have fixed placements;
    prior to physically laying out said datapath, assigning locations for said latches based upon said logical representation in such manner as to optimize said datapath according to a predetermined criteria;
    dividing said latches into banks based upon a logic nature of said latches;
    in said assigning step, grouping together same bank latches in a y-direction, wherein said y-direction is parallel with the direction of said datapath; and
    wherein said system is characterized as being an electronic design system for performing physical synthesis of an integrated circuit.

2. The system of claim 1, wherein said plurality of actions further comprise:
    using attractors between said same bank latches in order to force said grouping in said y-direction.

3. The system of claim 1, wherein said plurality of actions further comprise:
    in said assigning step, placing said same bank latches in an x-direction, using min-cost network flow algorithmic or linear programming approaches, wherein said x-direction is perpendicular to said y-direction.

4. The system of claim 3, wherein said plurality of actions further comprise:
    in said placing of said same bank latches, locating free spots lined up in said x-direction and calculate a placement cost for said free spots based on misalignments in said y-direction; and
    inserting said same bank latches in optimal free spots having minimum of said placement cost.

5. The system of claim 4, wherein said plurality of actions further comprise:
    successively continue until all said same bank latches have been placed.

6. The system of claim 3, wherein said plurality of actions further comprise:
    ensuing said placing of said same bank latches, placing local clock buffers (LCBs) based on minimizing a capacitive load on said LCBs, wherein said LCBs are configured to drive said latches.

7. The system of claim 3, wherein said plurality of actions further comprise:
    ensuing said placing of said same bank latches, placing local clock buffers (LCBs) based on limiting the maximum number of said same bank latches per each of said LCBs, wherein said LCBs are configured to drive said latches.

8. The system of claim 1, wherein said predetermined criteria is derived from functions related to minimizing total wire length in said datapath, or related to minimizing wire length perpendicular to the direction of said datapath, or related to minimizing a combination of total wire length of said datapath and of wire length perpendicular to the direction of said datapath.

9. A computer program product comprising a computer readable non-transitory storage medium having a computer readable program code embodied therewith, wherein said computer readable program code when executed on a computer causes said computer to:
    connect latches and pins by a logical representation of a datapath, wherein said pins have fixed placements;
    prior to physically laying out said datapath, assign locations for said latches based upon said logical representation in such manner as to optimize said datapath according to a predetermined criteria;
    divide said latches into banks based upon a logic nature of said latches;
    while executing said assign locations step, group together same bank latches in a y-direction, wherein said y-direction is parallel with the direction of said datapath; and
    wherein said computer is executing a method characterized as being a physical synthesis of an integrated circuit.

10. The computer program product of claim 9, wherein said computer readable program code further causes said computer to:
    while executing said assign locations step, place said same bank latches in an x-direction, using min-cost network flow algorithmic or linear programming approaches, wherein said x-direction is perpendicular to said y-direction.

11. The computer program product of claim 10, wherein said computer readable program code further causes said computer to:
    in said place of said same bank latches step, locate free spots lined up in said x-direction and calculate a placement cost for said free spots based on misalignments in said y-direction; and
    insert said same bank latches in optimal free spots having minimum of said placement cost.

12. The computer program product of claim 11, wherein said computer readable program code further causes said computer to:
    successively continue until all said same bank latches have been placed.

13. The computer program product of claim 10, wherein said computer readable program code further causes said computer to:
    ensuing said place of said same bank latches step, place local clock buffers (LCBs) based on minimizing a capacitive load on said LCBs, wherein said LCBs are configured to drive said latches.

14. The computer program product of claim 10, wherein said computer readable program code further causes said computer to:
    ensuing said place of said same bank latches step, place local clock buffers (LCBs) based on limiting the maximum number of said same bank latches per each of said LCBs, wherein said LCBs are configured to drive said latches.

15. The computer program product of claim 9, wherein said computer readable program code further causes said computer to:
    derive said predetermined criteria from functions related to minimizing total wire length in said datapath, or related to minimizing wire length perpendicular to the direction of said datapath, or related to minimizing a combination of total wire length of said datapath and of wire length perpendicular to the direction of said datapath.

\* \* \* \* \*